(12) United States Patent
Wanni et al.

(10) Patent No.: US 6,811,685 B2
(45) Date of Patent: Nov. 2, 2004

(54) FOULING MITIGATION DEVICE WITH MOVABLE SCREEN

(75) Inventors: Amar S. Wanni, Falls Church, VA (US); Thomas M. Rudy, Warrenton, VA (US); Marciano M. Calanog, Gainsville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/643,377

(22) Filed: Aug. 19, 2003

(65) Prior Publication Data

US 2004/0069703 A1 Apr. 15, 2004

Related U.S. Application Data

(60) Provisional application No. 60/411,670, filed on Sep. 18, 2002.

(51) Int. Cl.[7] .............................................. B01D 33/00
(52) U.S. Cl. ..................... 210/97; 210/175; 210/181; 210/387; 210/435; 210/446; 210/499; 242/396.1; 242/538.2; 242/918; 96/421; 96/429; 55/351; 55/352; 55/354; 55/422; 55/491; 55/495; 55/506
(58) Field of Search ..................... 210/97, 175, 181, 210/359, 387, 400, 435, 446, 499; 55/351, 352, 354, 422, 490, 491, 495, 506; 96/421, 429; 242/396.1, 538.2, 918

(56) References Cited

U.S. PATENT DOCUMENTS

| | | | | |
|---|---|---|---|---|
| 1,982,639 A | * | 12/1934 | Christofferson | ............... 55/352 |
| 3,286,443 A | * | 11/1966 | Wooldridge et al. | ........... 96/429 |
| 3,337,898 A | * | 8/1967 | Zador et al. | .................... 15/404 |
| 3,350,855 A | * | 11/1967 | Revell | ........................... 55/354 |
| 3,368,333 A | * | 2/1968 | Merklin | ......................... 55/354 |
| 3,375,638 A | * | 4/1968 | Julien | .............................. 96/39 |
| 3,552,098 A | * | 1/1971 | Cochran | ........................ 96/418 |
| 3,552,101 A | * | 1/1971 | Papp | ............................. 55/354 |
| 3,559,380 A | * | 2/1971 | Neumann | ...................... 55/354 |
| 3,611,677 A | * | 10/1971 | Neumann | ...................... 55/354 |
| 3,695,008 A | * | 10/1972 | Neumann | ...................... 55/354 |
| 3,774,373 A | * | 11/1973 | Welch et al. | .................. 55/354 |
| 3,783,588 A | * | 1/1974 | Hudis | .............................. 96/58 |
| 3,800,509 A | * | 4/1974 | Carr et al. | ...................... 96/18 |
| 3,912,632 A | * | 10/1975 | Winzen | ....................... 210/137 |
| 3,940,335 A | * | 2/1976 | Kalman | ....................... 210/780 |
| 4,062,779 A | | 12/1977 | Nakamura et al. | |
| 4,174,205 A | * | 11/1979 | Koushiafes | ................... 55/354 |
| 4,191,653 A | | 3/1980 | Hampton | |

(List continued on next page.)

Primary Examiner—Robert James Popovics
(74) Attorney, Agent, or Firm—Malcolm D. Keen (57) ABSTRACT

A self-cleaning strainer which may be installed upstream of a heat exchanger to prevent debris greater than a critical size from reaching the heat exchanger. The strainer is preferably mounted just upstream of a heat exchanger in order to minimize the possibility of debris reaching the heat exchanger. The strainer comprises a screen element which can be advanced across the flow path of the fluid between two rollers. The screen element is placed so that the fluid must flow across the screen element face to continue through the process pipe; the screen may be perpendicular or parallel to the fluid flow axis of the strainer body or at an intermediate angle to it. Flow blocking members are used so as to direct the flow to pass through the screen element.

18 Claims, 8 Drawing Sheets

U.S. PATENT DOCUMENTS

| | | | | |
|---|---|---|---|---|
| 4,221,576 A | * | 9/1980 | Phillips, Jr. | 55/352 |
| 4,261,822 A | | 4/1981 | Richardson | |
| 4,405,342 A | * | 9/1983 | Bergman | 95/69 |
| 4,470,833 A | * | 9/1984 | Wolfe | 96/429 |
| 4,477,350 A | * | 10/1984 | Brandt et al. | 210/387 |
| 4,518,494 A | | 5/1985 | Jackson | |
| 4,521,230 A | * | 6/1985 | Strong | 96/418 |
| 4,561,975 A | | 12/1985 | Schloss, Jr. | |
| 4,822,486 A | | 4/1989 | Wilkins et al. | |
| 4,894,071 A | * | 1/1990 | Klein | 95/273 |
| 4,976,749 A | * | 12/1990 | Adamski et al. | 95/63 |
| 5,108,592 A | | 4/1992 | Wilkins et al. | |
| 5,192,429 A | | 3/1993 | Bader | |
| 5,215,656 A | | 6/1993 | Stoneburner | |
| 5,217,512 A | | 6/1993 | Williams | |
| 5,217,513 A | * | 6/1993 | Armbruster | 96/414 |
| 5,411,579 A | * | 5/1995 | Benton et al. | 95/277 |
| 5,529,593 A | | 6/1996 | Simmons | |
| 5,556,592 A | * | 9/1996 | Hitchings | 266/227 |
| 5,599,363 A | * | 2/1997 | Percy | 55/352 |
| 5,676,197 A | | 10/1997 | Diebold et al. | |
| 5,676,731 A | * | 10/1997 | Hitchings | 75/407 |
| 5,912,423 A | * | 6/1999 | Doughty et al. | 95/107 |
| 6,139,727 A | | 10/2000 | Lockwood | |
| 6,152,998 A | * | 11/2000 | Taylor | 96/429 |
| 6,168,646 B1 | * | 1/2001 | Craig et al. | 95/14 |
| 6,221,120 B1 | | 4/2001 | Bennington et al. | |
| 6,231,764 B1 | | 5/2001 | Wilkins | |
| 6,402,822 B1 | * | 6/2002 | Najm | 96/429 |
| 6,491,735 B2 | * | 12/2002 | Najm | 55/492 |
| 6,632,269 B1 | * | 10/2003 | Najm | 95/273 |
| 6,734,801 B2 | * | 5/2004 | Scofield | 340/607 |
| 6,736,965 B2 | * | 5/2004 | Cousineau et al. | 210/104 |
| 6,743,282 B2 | * | 6/2004 | Najm | 96/429 |
| 2004/0069703 A1 | * | 4/2004 | Wanni et al. | 210/400 |

* cited by examiner

FOULING MITIGATION DEVICE WITH MOVABLE SCREEN

This application claims the benefit of U.S. Provisional application 60/411,670, filed Sep. 18, 2002.

FIELD OF THE INVENTION

The present invention relates generally to heat exchanger equipment and to processes employing such equipment and more particularly to straining devices which are placed upstream of heat exchangers and other fluid equipment.

BACKGROUND

One of the most problems associated with the use of heat exchangers is the tendency toward fouling. Fouling refers to the various deposits and coatings which form on the surfaces of heat exchangers as a result of fluid flow and heat transfer. There are various types of fouling including corrosion, mineral deposits, polymerization, crystallization, coking, sedimentation and biological. The situation is made even worse due to the fact that various fouling types can interact with each other to cause even more fouling. Fouling can and does result in additional resistance with respect to the heat transfer and thus decreased performance with respect to heat transfer. Fouling also causes an increased pressure drop by reducing the flow area for the fluid flowing on the inside of the exchanger.

There are a large number of techniques suitable for reducing fouling which can take the form of structural features within the heat exchanger body itself. Significant fouling reduction can however also be achieved by removing debris from the process stream upstream of the heat exchanger. In fact, the presence of debris in various streams that are fed into heat exchangers as well as fluid streams which flow through other devices can cause significant problems that, in some cases, can not be remedied, even by the most effective fouling mitigation technique within the heat exchanger or other device. Fouling can result in problems such as hydraulic limitations, poor heat exchanger thermal performance and premature tube failures causing unplanned unit shutdown. In addition, frequent opening and closing of heat exchangers can lead to poor reliability as a result of wear and tear on the heat exchanger and possible damage to heat exchanger components.

In many petrochemical processes, straining of debris upstream of the heat exchanger is provided by a bucket-type strainer. Unfortunately, because these devices are cumbersome and require frequent cleaning, they are often eliminated from the fluid flow circuits. As a result, many flow streams, although they may have been designed to include a straining function, often do not have one in practice. In some cases, straining functionality may even be left out of the process design because of expense or because of an understanding of the realities of the difficulties in using bucket-type straining devices. Even if one of these straining devices is included in the fluid flow, the strainer must usually be bypassed during cleaning and large debris can therefore pass towards the heat exchanger when cleaning is underway. This problem can be avoided through the use of at least two strainers, connected in parallel, in the process but such a solution adds significant expense. Strainers require isolation, draining, and steam-cleaning before they can be taken apart for cleaning. This is a tedious and time-consuming process.

While various strainer types that provide automatic cleaning as debris builds up within the straining device exist, these devices are generally very expensive, relatively ineffective or both. In addition, since automatic strainers require motors, electrical power is required and the drive mechanism and motor reliability can become concerns. Finally, automatic strainers require a third fluid stream to remove the debris. This stream and the supporting hardware and piping create additional maintenance and upkeep requirements.

SUMMARY OF THE INVENTION

According to the present invention, a self-cleaning strainer comprises a movable screen element that is attached to two rollers and placed in the fluid flow path to intercept debris in the fluid comprises:

(a) a housing into which the flow stream passes from the flow pipe for filtration and from which it passes after filtration;

(b) a screen element;

(c) a source roller attached to a first end of the screen element; and (d) a take-up roller attached to a second end of the screen element.

The screen element extends across the interior of the housing in the path of the flow stream to define (i) a flow region upstream of the screen and a flow region downstream of the screen, (ii) an active portion of the screen element which is in the path of the flow stream and through which the flow stream may pass, and (iii) a non-active portion, and means for rotating the source roller and the take up roller to move the screen element from the source roller to the take-up roller so as to periodically replace the active portion of the screen element with a previously non-active portion of the screen element.

The screen element may be placed perpendicular to the fluid flow direction in the housing so that the fluid flow in a straight line flow path directly through the screen element to continue on through the equipment. Alternatively, the screen element may be placed at another angle to the flow. It may be placed parallel to the general flow axis (but still in the path of the fluid flow), with blocking members to force the flow direction at the inlet to turn in order to pass through the screen. As a result, the fluid passes through the screen element to intercept any debris particles caught up in the fluid.

The rollers contain a length of screen element with its face in the flow channel, that may be rolled from one roller to another over time. The rollers may be operated manually or by an electric motor. Various options are available for triggering the rotation of the rollers to feed new screen element length into the flow channel. In addition to manual rotation as determined by an operator, automated rolling may occur based upon, for example, elapsed time and/or a specific level of debris buildup as measured by an increase in the pressure drop across the screen element. Other automatic advance triggers are also possible.

The present invention provides many advantages including a significant reduction of debris within various fluid flow systems particularly those that include a heat exchanging function. In the case of processes involving heat exchangers, the removal of debris upstream of the heat exchanger provides a very significant amount of fouling reduction and the strainer may be used either with or without other fouling mitigation techniques within the heat exchanger itself. The present strainer may be employed in a great many applications only one of which is processes that include heat exchangers. The present strainer may be used in connection with any application which involves any fluid and which benefits from the removal of debris particles from the fluid flow in order to improve process performance, preserve process equipment or otherwise.

DETAILED DESCRIPTION

Figure 1:
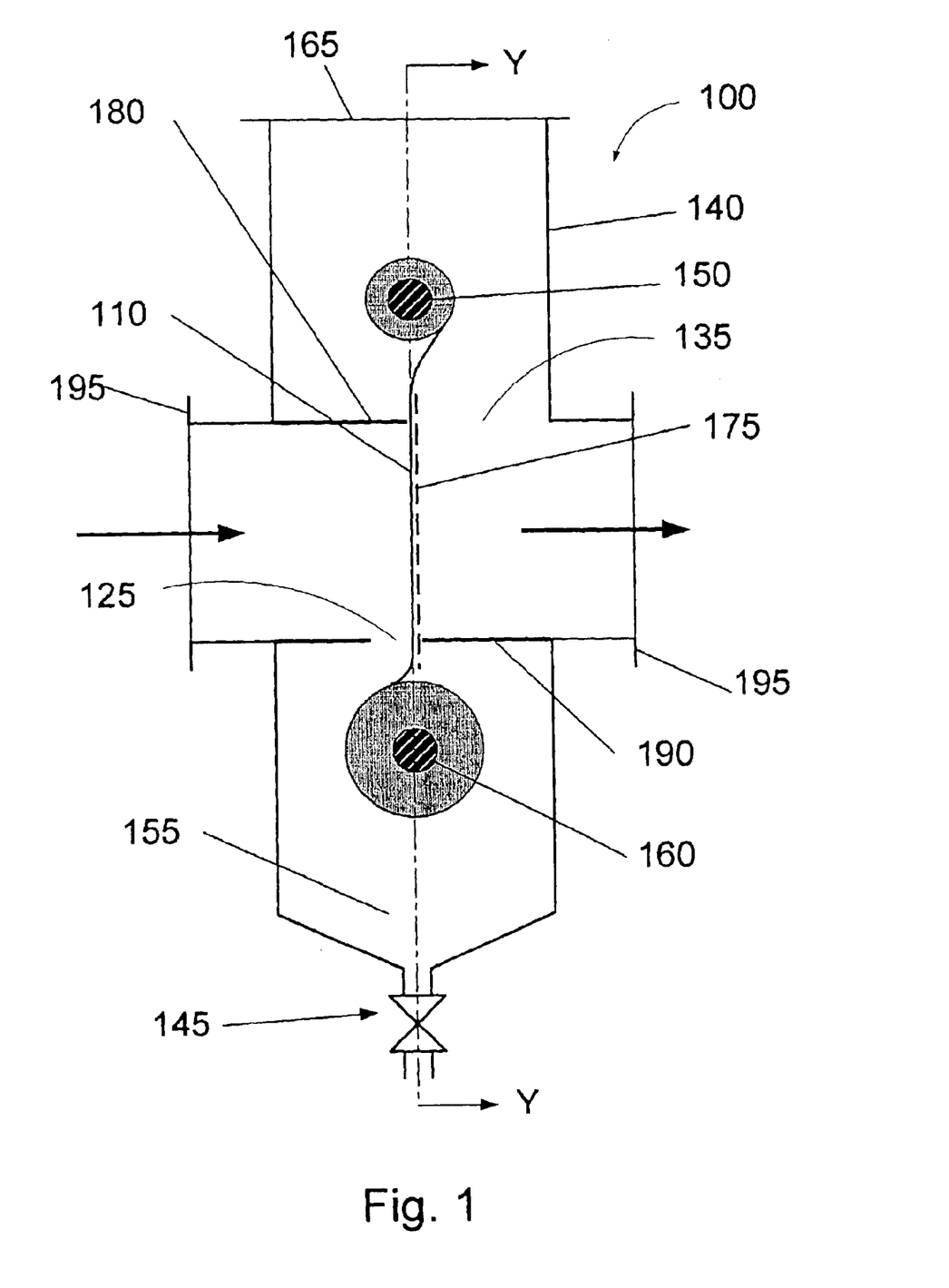
FIG. 1 is a schematic diagram providing a side view, as viewed from the flow direction, of the fouling mitigation device of the present invention in a first embodiment in which the filtering screen element is placed in position perpendicular to the flow direction through the device.
Figure 2:
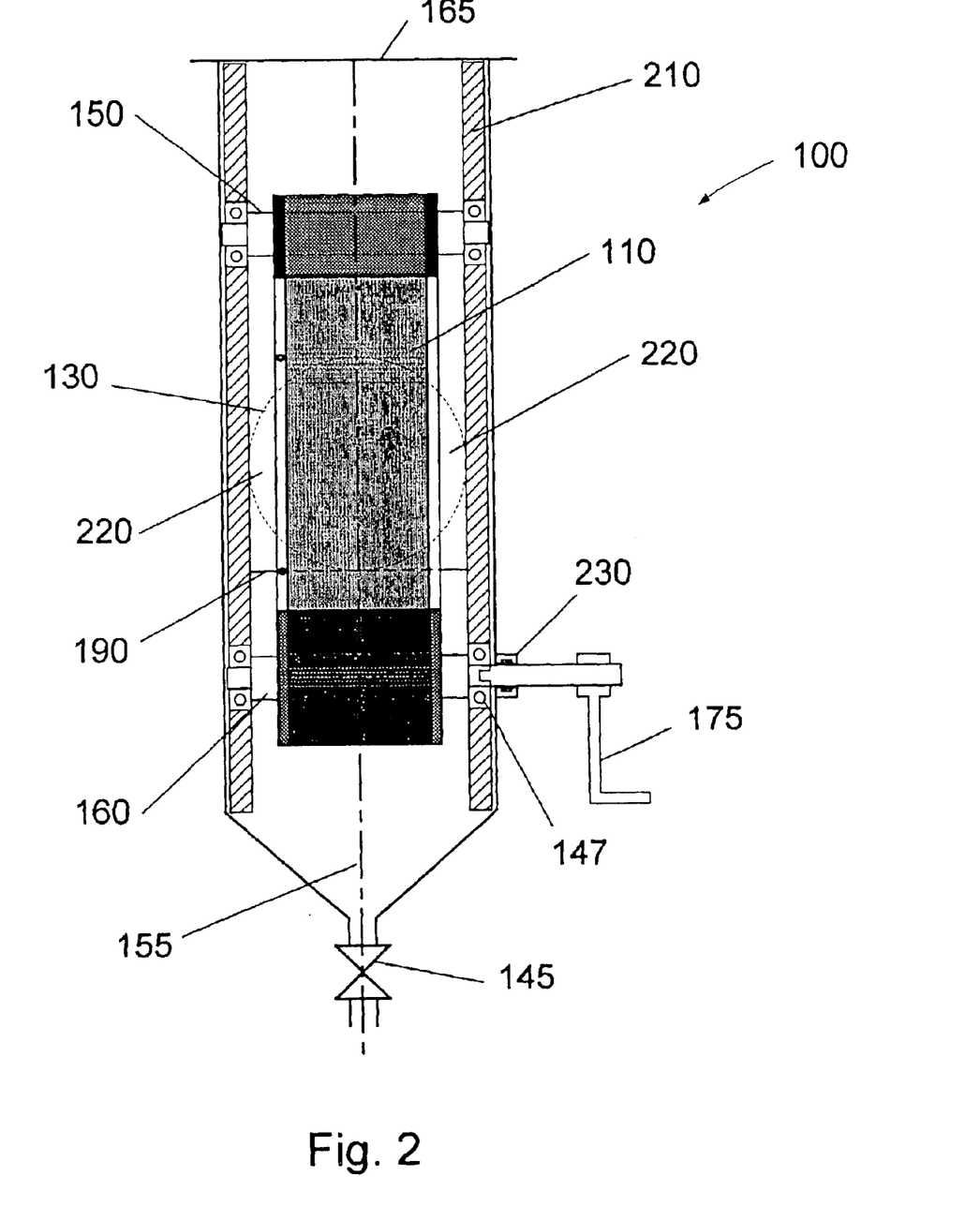
FIG. 2 is a schematic diagram of cross-section Y—Y of FIG. 1 providing a front view of the fouling mitigation device.

FIGS. 1 and 2 illustrate the fouling mitigation device 100 of the present invention, referred to for convenience a the strainer, in a form in housing 140 in which the filtering screen 110 is placed in position perpendicular to the direction of the flow axis occurring through and through housing 140 and in a substantially vertically upright position. FIG. 1 provides a side view of the device and FIG. 2 provides an end view of the device. Filtering screen 110 comprises a length of screen material which is wound on source roller 150 and on take up roller 160. Although these Figures show source roller 150 and take up roller 160 on a vertical centerline, each may be alternatively displaced from this centerline by some amount in order to optimize performance. Filtering screen 110 is preferably manufactured from a wire mesh or perforated sheet which may be stainless steel or some other metal which is resistant to corrosion or some non-metallic material if it is compatible with the flowing fluid. In one embodiment, for example, filtering screen 110 may measure 20 cm wide, 3 mm thick and 36 m long. The length of filtering screen 110 is preferably sufficient to permit continued use without requiring installation of a new filtering screen 110 or cleaning of the existing filtering screen 110 for a period of five years or more, to coincide with normal turnaround schedules although the time required between required changes of filtering screen 110 will depend on many factors such as the actual length of the installed filtering screen 110, the amount and type of debris in the fluid stream, the frequency and factors at and upon which the filtering screen 110 is advanced and other factors.

By rolling filtering screen 110 from source roller 150 to take up roller 160 over time, cleaning of the actual element which captures debris is unnecessary because this element is replaced with a new portion of filtering screen when the filtering element becomes dirty to the point where its effectiveness is reduced and/or flow is significantly reduced.

Fouling mitigation device 100 consists of a cruciform housing 140 which contains source roller 150, take up roller 160 and filtering screen 110. Filtering screen 110 is rolled from source roller 150 to take up roller 160 within the chamber. Rolling of the filtering screen may occur manually as determined by an operator using crank 175 or some other mechanism which causes take up roller 160 to wind additional filtering screen 110 from source roller 150 onto take up roller 160. A crank may also be employed in connection with source roller 150 in order to permit an operator to manually move filtering screen 110 in both directions. Reverse movement may be used, after removing fouling mitigation device 100 from the fluid stream, for the purpose of cleaning filtering screen 110. Alternatively, the screen may be rolled automatically from source roller 150 to take up roller 160 as a result of a specified level of debris on the active portion (i.e. the portion of filtering screen 100 presently within pipe 130) of screen 110 as determined by pressure drop changes across the active portion of the screen.

Automatic rolling from source roller 150 to take up roller 160 can take place irrespective of a change in pressure drop but instead at a predetermined rolling rate per unit time. In this case, rolling occurs on a periodic basis over time but preferably only with respect to a portion of the active screen length. Thus, for example, if the active screen length present in the pipe is approximately 15 cm (corresponding to an approximate 15 cm pipe cross section diameter), rolling may occur once a day with a roll amount of 25 mm. As such, in this example, the active portion of filtering screen 110 will be completely replaced each six days but on a staggered basis. Alternatively, the complete active portion of filtering screen 110 may be replaced all at once at some fixed periodic rate. For example, filtering screen 110 may be advanced a full 15 cm once every six days in the case of a 15 cm pipe cross section. The present strainer is not necessarily limited to use with pipes having a circular cross-section; it may easily be adapted to fluid flow structures with non-circular cross-sections.

As can be seen in FIGS. 1 and 2, pipe 130 passes through the cruciform housing 140 forming the body of strainer 100 which extends from top cap 165 at one end to debris flushing valve 145 at the other end. Strainer 100 is placed in the fluid flow in a vertical position so that debris particles having a density which is greater than that of the fluid fall off filtering screen 110 under gravity into debris collection area 155. Debris may be flushed periodically from debris collection area 155 at the bottom of fouling mitigation device 100 by opening debris flushing valve 145. Process fluid can pass through bottom opening 125 into the lower chamber of fouling mitigation device 100 but lower blocking member 190 which engages with stationary screen support member 175 at the rear face of screen 110 prevents the fluid which has not passed through filtering screen 110 from entering the flow region downstream of screen 110 and from there into pipe 130. Bottom opening 125 preferably comprises an opening of approximately 25% of the diameter of pipe 130 in its lateral length along the flow direction of pipe 130. This size is big enough to permit debris of larger particle size to fall into debris collection area 155 but not so large as to create excessive re-circulation flow between pipe 130 and fluid volume surrounding take up roller 160.

When a new filtering screen 110 is installed, the majority of filtering screen 110 is present on source roller 150.

Filtering screen 110 is fed through the cross section of pipe 130 and then a leader portion of filtering screen 110 is rolled onto take up roller 160. Bearings 147 are preferably used in connection with both source roller 150 and take up roller 160 so as to ensure smooth rotational operation and to avoid the possibility of the shafts becoming jammed by mud-like sedimentation that could occur in many processes.

The moving mechanical parts of strainer 100 may be accommodated in removable cartridge 210 within housing 140. Cartridge 210 may be slidably inserted and removed into and out of the upper portion of housing 140 which is permanently placed forming a cruciform relationship with pipe 130 forming the filtering area at the intersection of two intersecting cylindrical bodies, housing 140 and 130. In a preferred embodiment, removable cartridge 210 houses bearings 147, rollers 150 and 160, filtering screen 110, blocking members 180 and 190 and blocking members 220. Seal 230 surrounding the actuating shaft for roller 160 (here, the shaft of crank 175) prevents leakage past the shaft.

In addition to bottom opening 125, strainer 100 also includes a top opening 135 which permits process fluid which has flowed through filtering screen 110 to enter the upper chamber strainer 100 from the flow regions downstream of the screen. Process in chamber 100 is prevented from re-entering the flow region upstream of filtering screen 110 by upper blocking member 180 which extends from the wall of housing 140 into sliding contact with the front face of screen 110. Flanges 195 are typically included so that the strainer can be connected to existing piping and removed for maintenance. Support element 175 in sliding contact with the rear face of screen 110 provides additional structural support to filtering screen 110 and suitably comprises a perforated plate through which the filtered process liquid can flow.

Figure 6:
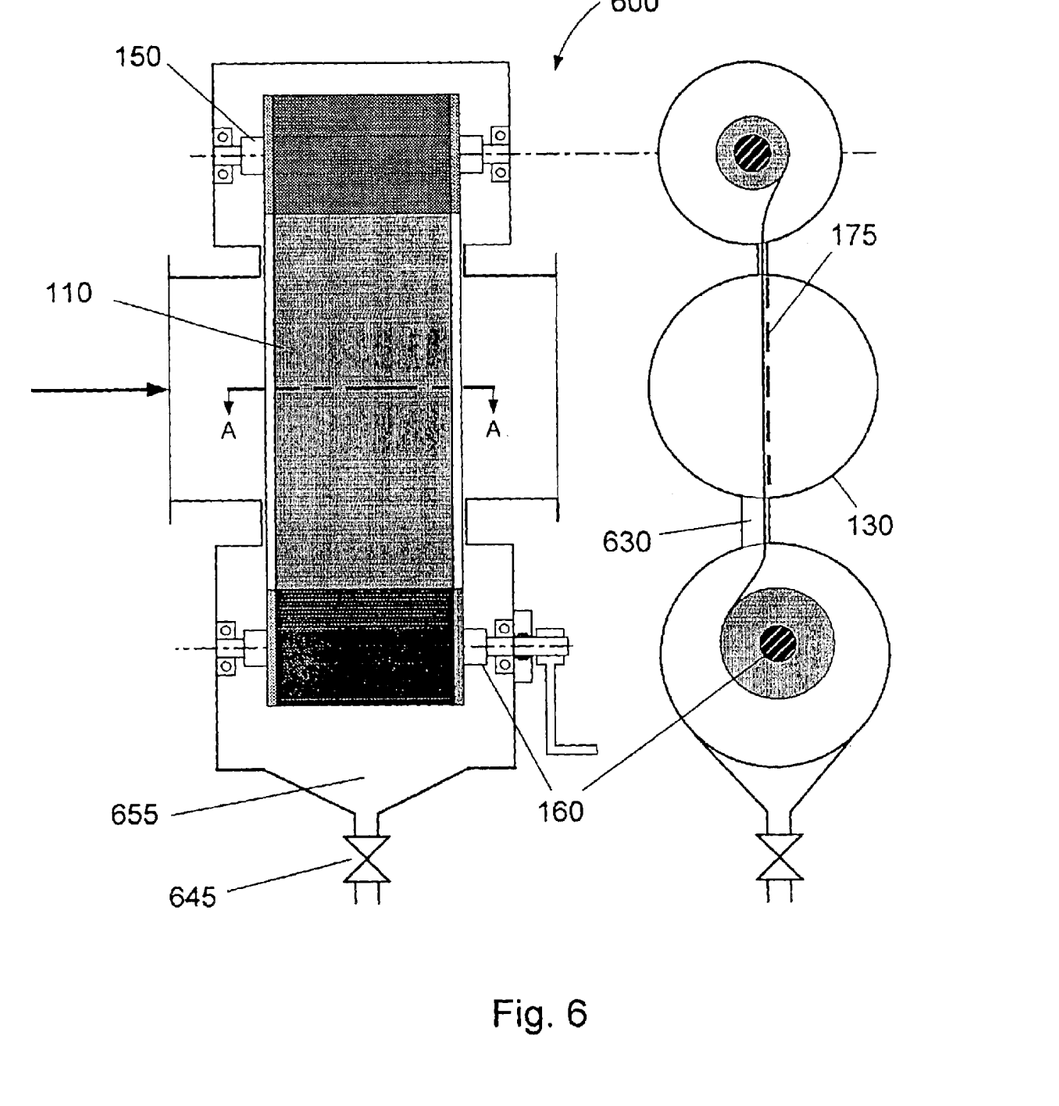
FIG. 6 is a schematic diagram providing side and front views, as viewed from the flow direction, of the present fouling mitigation device in a second embodiment in which the filtering screen element is placed in position such that it is parallel to the flow direction through the device.
Figure 7:
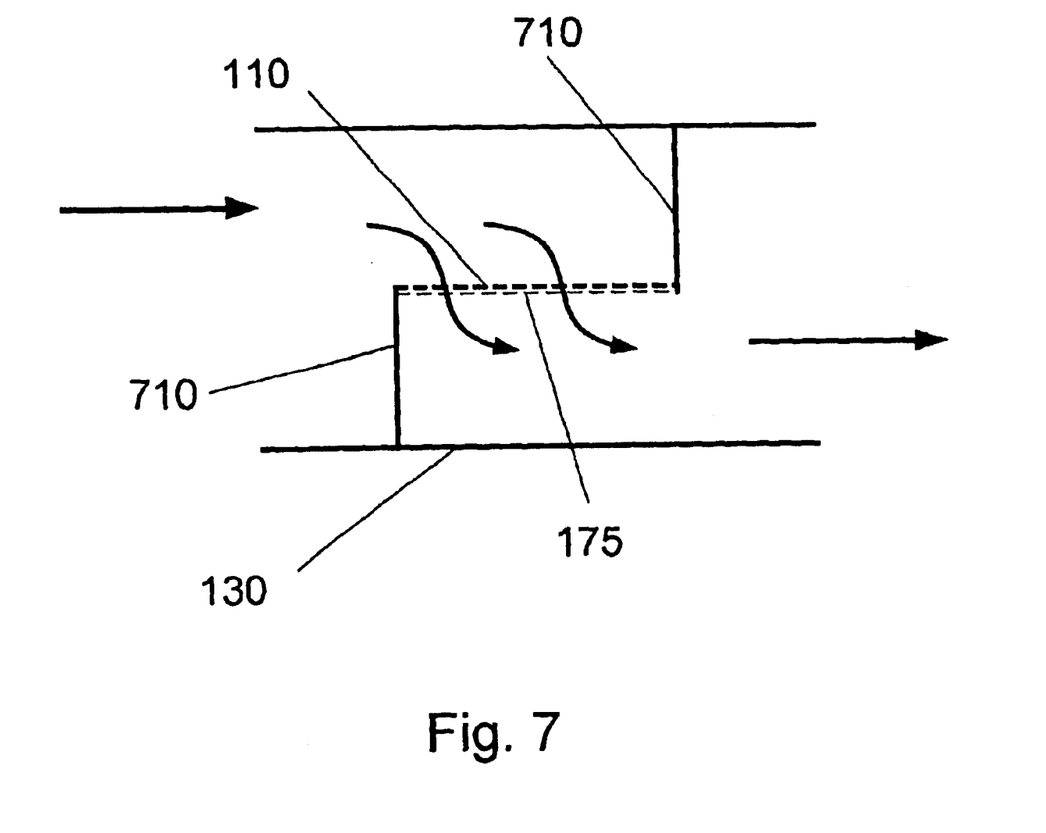
FIG. 7 is a schematic diagram of cross-section A—A of FIG. 6 providing a plan view.

Strainer 100 need not be interposed at a ninety-degree angle to axis of housing 140 and pipe 130 as shown in FIGS. 1 and 2. As an alternative, it may be interposed at a slanted angle relative to the axis (in the flow direction) of housing 140 and pipe 130. One advantage of doing so is to provide additional active surface area for the portion of filtering screen 110 that is deployed to trap debris as opposed to the case in which pipe 130 and fouling mitigation device 100 are deployed in the ninety-degree cruciform arrangement. As shown in FIGS. 6 and 7 below it may also be interposed parallel to the axis of pipe 130.

Figure 3A:
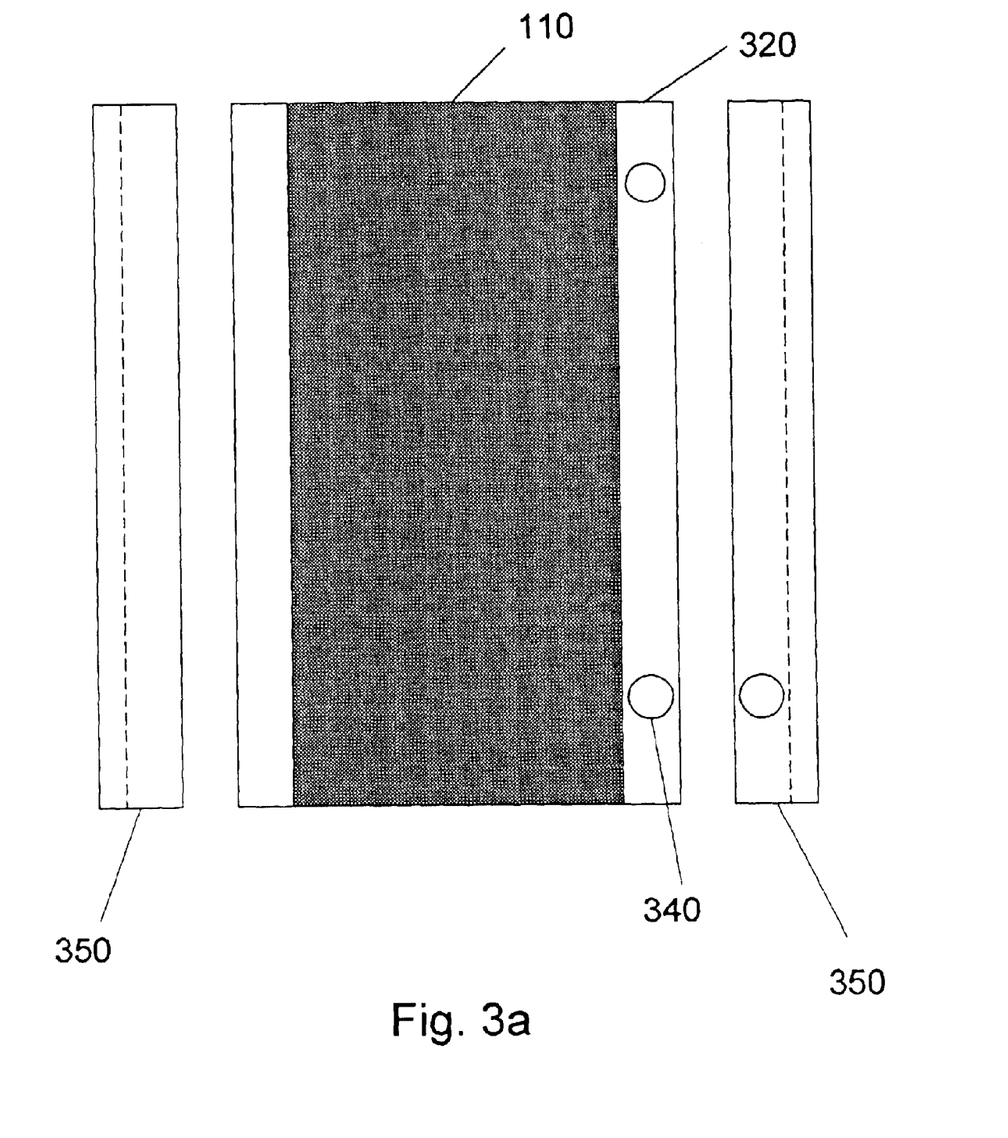
FIG. 3a is an exploded front view of the filtering screen in one embodiment of the present invention showing a screen lock which controls the advance of the filtering screen.

A close up view of filtering screen 110 is provided in FIG. 3a. As shown in FIG. 3a, filtering screen 110 may include, on one or both edges, metal band 320 which contains evenly spaced holes 340. Holes 340 are arranged such that a pin (FIG. 4) located at or near the top of the lower chamber of strainer 100 and near the lower surface of pipe 130 may be selectively engaged within at least one of the holes 340. The pin-and-hole feature of this embodiment serves to assist in controlling the proper advancement of filtering screen 110 as well as holding filtering screen 110 in place during normal operation.

Figure 3B:
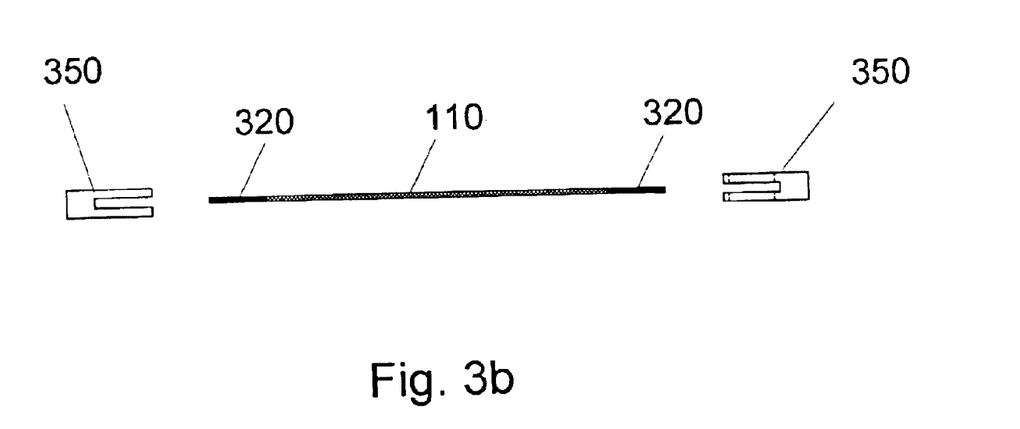
FIG. 3b is a plan view of the filtering screen in one embodiment of the present invention showing the guide elements.

Depending upon the particular application, holes 340 within metal band 320 may be spaced apart a length which is equal to one complete advancement of filtering screen 110 in which the complete "active" portion of filtering screen 110 is replaced by a complete new "active" portion of filtering screen 110. For example, if the diameter of pipe 130 is equal to approximately 15 cm and so is the "active" portion of filtering screen 110, holes 340 may be spaced apart approximately the same distance to ensure complete replacement of the "active portion" during a normal advancement of filtering screen 110. Alternatively, if incremental advances of filtering screen 110 are desired (i.e., less than the complete "active" portion is replaced in connection with one advancement) holes 340 may be spaced apart some length which is less than the length of one active portion. For example, holes 340 may be spaced apart 5 cm for a 15 cm active portion allowing three advancements to completely replace the active portion of filtering screen 110. In FIG. 3b, it can be seen that removable cartridge 210 also preferably includes a pair of guides 350 which accept metal bands 320 of filtering screen 110 to lend additional strength to screen 110.

The pin-and-hole screen lock feature may be employed with either automatic advancement implementations (in which the pin is automatically retracted from hole, filtering screen 110 is advanced and the pin is then replaced in another hole 340) or in manual advancement implementations (in which an operator manually retracts the pin from the hole, advances filtering screen 110 and then replaces the pin in the next hole 340).

Figure 4:
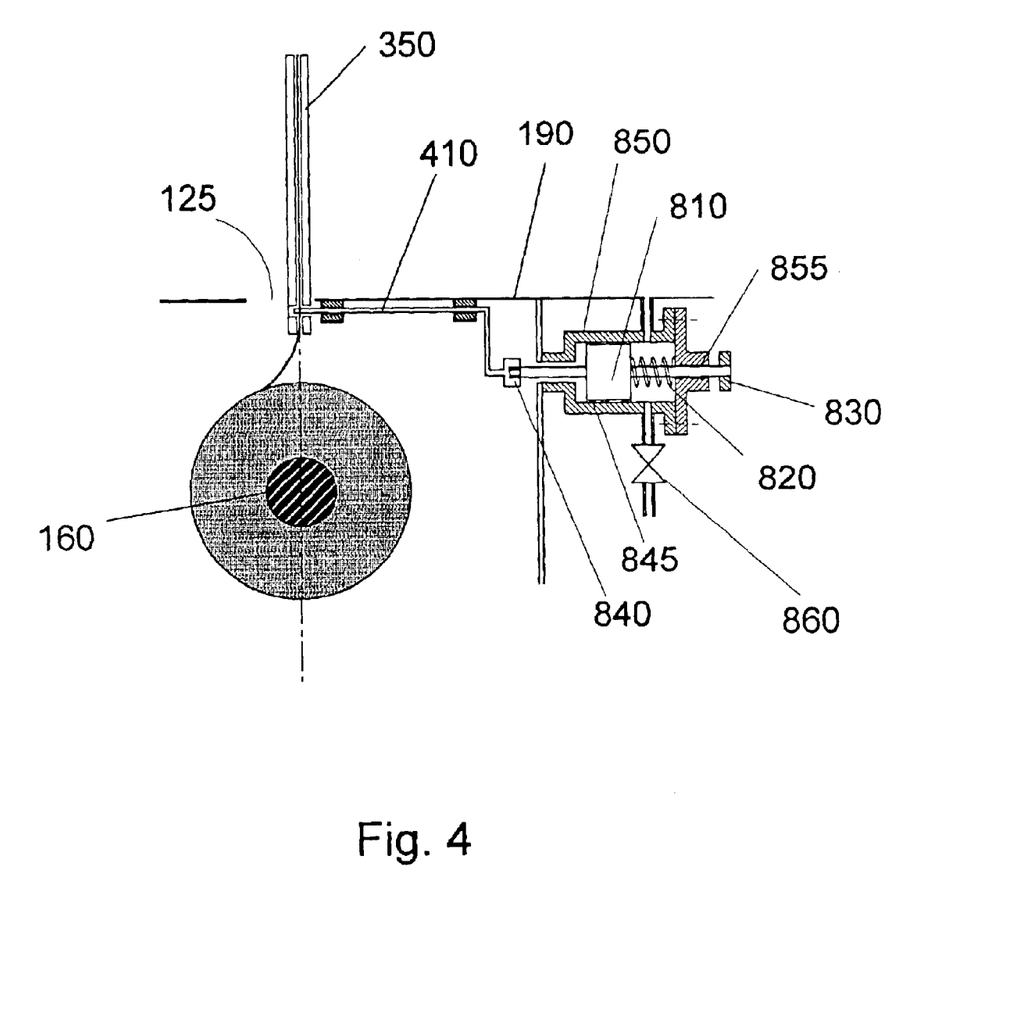
FIG. 4 is a schematic diagram illustrating one embodiment of the screen lock.

FIG. 4 illustrates a screen lock actuation mechanism that may be employed in connection with the pin-and-hole feature described above as one example of how a pin-and-hole feature could be implemented. In this form, pin 410 is movable so that it may selectively be placed in a forward position to pass through hole 340. When filtering screen 110 needs to be advanced, pin 410 may be moved to a rearward position in which it is not engaged within a hole 340, so filtering screen 110 is freely movable. The pin actuation mechanism consists of piston 810 which is positioned at its extreme left position when filtering screen 110 is clean. Piston 810 is forced into this position by the force of coil spring 820 which pushes against piston 810 in cylinder 850 in the direction of piston receptacle 840 and which, in turn, pushes pin 410 leftward so that it protrudes into hole 340. As debris collects on screen 110, the downstream pressure decreases and piston 810 moves to the right as a result of the relatively higher upstream pressure transmitted to the interior of cylinder 850. At some point, enough debris collects on screen 110 to result in enough of a decrease in downstream pressure to cause pin 410 to retract completely out of hole 340 thus permitting the free lateral movement of filtering screen 110. If piston 810 becomes stuck, pin 410 may be manually retracted from hole 340 by pulling piston 810 back through the use of knob 830. Drain valve 860 may be included so as to permit the removal of sedimentation which may enter into and settle in the piston mechanism. Piston mechanism also includes O-rings 845 which are placed on the piston to ensure that fluid does not leak from one side of piston to the other. O-ring seals 855 are placed on the stem of piston 810 where it exits cylinder 850 to prevent leakage from cylinder 850.

Figure 5:
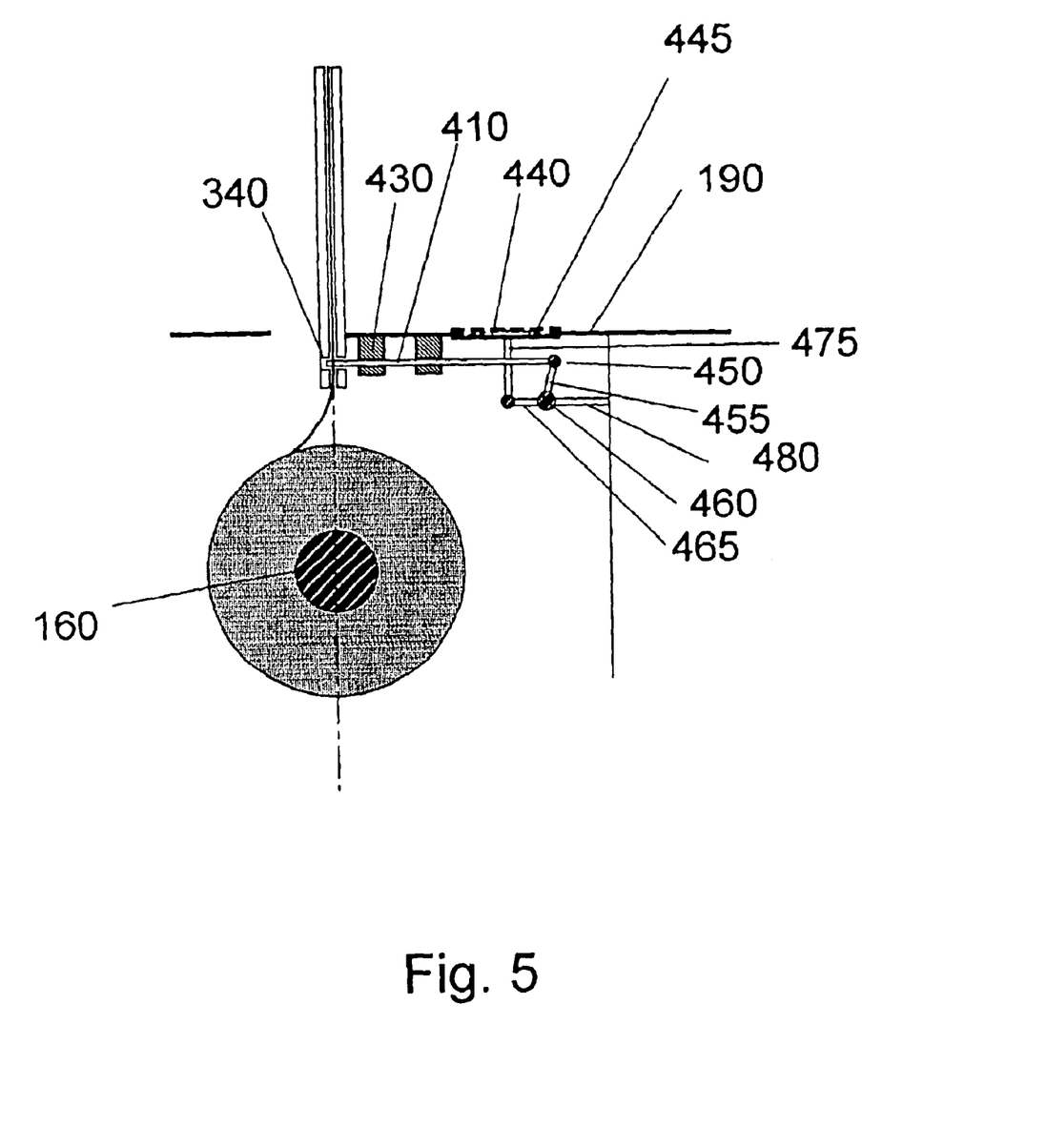
FIG. 5 is a schematic diagram illustrating a second embodiment of the pin-and-hole feature.

In another version of the pin mechanism which is described in connection with FIG. 5, the overall pin mechanism includes a diaphragm to move the piston to actuate the screen pin. Pin 410 comprises an arm which extends toward pivot 450 and a substantially vertical arm 455 extends downward away from pivot 450 and terminates at main pivot 460. Pin 410 may pass through guide 430 to ensure that pin 410 stays straight and lines up properly with holes 340. A third arm 465 extends generally parallel to pin 410 and terminates at yet another pivot 470. Finally, a substantially vertical arm 475 extends upward from pivot 470 and terminates where it contacts diaphragm 440. Diaphragm 440 is preferably comprised of stainless steel and may have a thickness of approximately 1.5 mm with a diameter of approximately 10 cm but other materials and other sizes may be used so long as it has the required mechanical properties to actuate the piston and the pin mechanism. Support element 480 is preferably included to attach pivot point 460 to the frame of removable cartridge 210.

When debris and other solid materials build up over time on the surface of filtering screen 110 that faces the fluid flow (the front surface), a pressure differential between the front surface of filtering screen 110 and the rear surface of filtering screen 110 is created. Diaphragm 440, due to its flexible nature, will move either in the direction inward towards the bottom chamber of fouling mitigation device 100 or inward toward the interior of pipe 130, depending on the sense and magnitude of the pressure differential.

As debris builds up on the front surface of filtering screen 110, the pressure differential across filtering screen 110 and thus across diaphragm 440 causes diaphragm 440 to move upward into the interior of pipe 130. This, in turn, causes pin 410 to move in the direction away from filtering screen 110 thus removing pin 410 from hole 340. When this action is combined with either automatic or manual advancement of filtering screen 110, the combination ensures that filtering screen 110 can be advanced at the point when a predefined pressure differential exists across filtering screen 110. The pressure differential which is required to move pin 410 can be controlled specifically by a particular combination of diaphragm sizing, diaphragm materials, diaphragm placement, pivots, and arm and pin sizing and placement. In an embodiment in which automatic advancement of filtering screen 110 is employed, automated advancement (in addition to pin movement) may also be triggered based upon a predefined pressure differential across filtering screen 110. Backing element 445 may be included and placed on the low-pressure side surface of diaphragm 440 to prevent damage to diaphragm 440 in the case of extremely high pressure differentials. Backing element 445 should be placed to allow a large enough gap between it and diaphragm 440 so as to allow for normal deflection of diaphragm 440.

Selective pin 410 withdrawal from holes 340 may also be accomplished by use of an electric transducer coupled to an actuator. The transducer may be configured to measure the pressure difference across filtering screen 110. A resulting signal which indicates the value of such pressure difference may be fed to a control system and actuator which, in turn, causes pin 410 to be retracted from hole 340 and the automatic advancement of filtering screen 110 as desired.

FIG. 6 shows an embodiment of strainer in which the face of filtering screen 110 is placed parallel to the flow axis of the strainer housing and of the flow pipe to which it is connected (as opposed to perpendicular to the flow as in FIG. 1). In order for the actual fluid to pass through the screen 110, the flow is caused to make a ninety-degree turn through the use of blocking members within housing 140. The face of screen 110 is placed parallel to the flow axis of the strainer body and of pipe 130 and blocking member 710 is placed within pipe 130 so as to ensure that the flow passes through filtering screen 110 as opposed to around it. Filtering screen 110 in this embodiment is a flat screen element that is essentially located on the central plane of pipe 130. Blocking member 710 is configured so that any cross-sectional area of pipe 130 that is not covered by filtering screen 110 is blocked by blocking element 710. Blocking member 710 may be constructed as a single piece or as a multiple pieces placed in housing 140 so preclude by-passing of flow around filtering screen 110.

FIG. 6 shows that strainer 600 comprises many of the same components as are present in the first embodiment of the present invention in which filtering screen 110 is placed perpendicular to the flow axis. Strainer 600 includes heavy debris collection area 655 for collecting debris that falls from filtering screen 110. A large gap area 630 is preferably included in the area between pipe 130 and the housing holding take-up roller 160 to allow debris to fall into heavy debris collection area 655. Debris flushing valve 645 may be used to flush debris from fouling mitigation device 600 as necessary. As can be seen from the end view presented on FIG. 6, rather than pipe 130 and housing 140 forming a cruciform shape as in FIG. 1, in the second embodiment, source roller 150, take up roller 160 and pipe 130 are spatially related as three laterally spaced circular cylindrical bodies. As can be further seen, filtering screen 110 passes from source roller 150 through pipe 130 and onto take up roller 160. Filtering screen 110 is disposed in pipe 130 so that only the relatively small leading edge of filtering screen 110 faces the flow direction; the width of filtering screen 110 running parallel with flow direction may be as large as desired to provide the required filtering surface area through which the liquid may pass. This results in a less frequent need to advance filtering screen 110 since debris will be spread over a larger surface area of filtering screen 110. This is in contrast to the first embodiment of the present invention in which the surface area of the face of filtering screen 110 is limited to the cross-sectional diameter of pipe 130.

What is claimed is:

1. A strainer device for removing debris particles from a flow stream in a flow pipe, comprising:

(a) a housing into which the flow stream passes from the flow pipe for filtration and from which it passes after filtration;

(b) a screen element;

(c) a source roller attached to a first end of the screen element; and (d) a take-up roller attached to a second end of the screen element;

in which the screen element extends across the interior of the housing in the path of the flow stream to define (i) a flow region upstream of the screen and a flow region downstream of the screen, (ii) an active portion of the screen element which is in the path of the flow stream and through which the flow stream may pass, and (iii) a non-active portion, and means for rotating the source roller and the take up roller to move the screen element from the source roller to the take-up roller so as to periodically replace the active portion of the screen element with a previously non-active portion of the screen element.

2. The device of claim 1 in which the device is placed upstream of a heat exchanger.

3. The device of claim 1 in which the screen element is disposed perpendicular to the flow direction of the flow stream in the housing.

4. The device of claim 1 in which a face of the screen element is disposed parallel to the flow direction of the flow stream in the housing.

5. The device of claim 4 further comprising at least one blocking member extending from the wall of the housing into sliding engagement with a face of the screen to cause the flow direction of the flow stream in the housing to rotate ninety degrees prior to passing through the screen element.

6. The device of claim 1 in which a face of the screen element is located at an acute angle to the flow direction of the flow stream.

7. The device of claim 1 which includes a screen support plate located at the rear face of the screen and fixed relative to the housing which permits the flow fluid to pass through it after passing through the screen and into the flow region downstream of the screen.

8. The device of claim 7 in which a flow blocking member extends from the wall of the housing into slidable engagement with the screen to form the flow region downstream of the screen into which the flow fluid passes after passing the screen.

9. The device of claim 7 in which a flow blocking member extends from the wall of the housing into engagement with a support plate located at the rear face of the screen and which permits the flow fluid to pass through it after passing through the screen, into the flow region downstream of the screen.

10. The device of claim 1 in which the screen element is located in a substantially vertical plane in the housing.

11. The device of claim 10 in which a flow blocking member extends from the wall of the housing into slidable engagement with the screen to form the flow region upstream of the screen and which blocks flow around the screen.

12. The device of claim 10 in which the screen is disposed substantially vertically in the housing and is movable with respect to flow blocking members extending from the wall of the housing to the flow regions upstream and downstream of the screen.

13. The device of claim 12 which includes (i) a collection chamber for filtered debris particles located below the active portion of the screen and (ii) a debris collection slot adjacent the upstream face of the screen and below the active portion of the screen to permit debris particles filtered from the liquid by the screen to fall into the debris collection chamber.

14. The device of claim 13 in which the slot extends across the upstream face of the screen.

15. The device of claim 1 which includes a motor and a motor controller which to selectively activate advance of the screen element.

16. The device of claim 15 in which the motor controller is connected to a pressure transducer sensitive to the pressure in the flow fluid across the screen element and which actuates the motor in response to a pressure increase in the flow fluid as debris particle accumulate on the screen.

17. The device of claim 1 in which the pin retractor is actuated in response to an pressure increase in the flow fluid as debris particle accumulate on the screen.

18. The device of claim 17 which includes by a movable element in communication with the flow region on the upstream side of the screen element and the flow region on the downstream side of the screen element.

* * * * *